Patented Oct. 20, 1953

2,656,366

UNITED STATES PATENT OFFICE 2,656,366

WATER-SOLUBLE ESTERS OF CORTISONE AND RELATED COMPOUNDS

Huang Minlon, Metuchen, N. J., assignor to Merck & Co., Inc., Rahway, N. J., a corporation of New Jersey No Drawing. Application July 27, 1950, Serial No. 176,247

6 Claims. (Cl. 260—397.4)

This invention is concerned generally with novel, water-soluble derivatives of cortisone and with novel processes for preparing the same. More particularly, it relates to acid esters (half esters) of cortisone with polybasic carboxylic acids, with alkali metal and alkaline earth metal salts of these acid esters, and with processes for preparing these compounds by reacting cortisone with a polybasic acid anhydride or halogenide, followed by treatment of the acid esters thus produced with aqueous alkali. The alkali metal and alkaline earth metal salts of the acid esters of cortisone are readily soluble in water, which property makes them useful in the cortisone therapy of arthritis and related diseases, particularly where the drug has to be injected intramuscularly.

Cortisone, the adrenal hormone previously known as Kendall's Compound E, is a chemical compound having the chemical name, $\Delta^4$-3,11,20-triketo-17$\alpha$,21-dihydroxy-pregnene. Cortisone acetate (i. e. $\Delta^4$-3,11,20-triketo-17$\alpha$-hydroxy-21-acetoxy-pregnene) is the only therapeutic form of cortisone available at the present time, and this compound is practically insoluble in water. For this reason, cortisone acetate is usually injected in the form of a saline suspension containing inert suspending agents and a preserving substance such as benzyl alcohol. This manner of administration possesses evident disadvantages as contrasted with facile injection of an aqueous solution of a water-soluble drug. It was therefore an object of the present invention to prepare derivatives of cortisone which would be relatively soluble in water. It was a further object to prepare derivatives which would be similar in action, except as regards water-solubility, to the cortisone acetate now utilized in cortisone therapy.

The foregoing objects have now been accomplished by preparing the novel acid esters of cortisone and the alkali metal and alkaline earth metal salts of said acid esters. These novel acid esters of cortisone, prepared according to the present invention, may be chemically represented as follows:

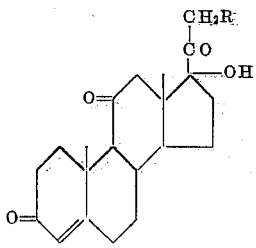

wherein R is a carboxy acyloxy radical.

These novel acid esters of cortisone can be prepared by reacting together, in an organic solvent, cortisone and the anhydride or halogenide of the desired polybasic acid. The acid esters of cortisone thus prepared are recovered from the reaction mixture utilizing conventional methods, as for example by evaporation of the organic solvent. The acid esters of cortisone are readily obtained in the form of white crystalline, high-melting compounds which are readily soluble in aqueous alkalies thereby producing aqueous solutions containing the corresponding alkali metal salts of the half esters, which are readily isolated by evaporation of said aqueous solutions.

In carrying out the present invention, it is ordinarily preferred to use, as the polybasic carboxylic acid, an aliphatic dicarboxylic acid such as succinic acid, glutaric acid, maleic acid, adipic acid, and the like, or an aromatic dicarboxylic acid such as phthalic acid, and the like. The reaction between the cortisone and the anhydride or halogenide of the polybasic carboxylic acid is preferably carried out in an organic solvent such as pyridine, benzene, chloroform, and the like, thereby forming the desired acid ester of cortisone. The acid ester of cortisone can be recovered by evaporating the organic solvent; when pyridine is employed as the solvent it is ordinarily preferred to mix the reaction solution with aqueous hydrochloric acid, whereupon the acid ester of cortisone precipitates and can be recovered by filtration or centrifugation. The acid esters of cortisone can be purified, if desired, by conventional means as, for example, by recrystallization from a solvent such as methanol, acetone-petroleum ether, and the like.

The acid esters of cortisone are reacted with an aqueous solution containing a basic compound of an alkali metal or alkaline earth metal as, for example, an alkali metal carbonate, an alkaline earth metal carbonate, an alkaline metal bicarbonate, an alkaline earth metal bicarbonate, an alkaline metal hydroxide, an alkaline earth metal hydroxide, and the like, thereby producing an aqueous solution of the corresponding metal salt of the acid ester of cortisone. It is ordinarily preferred to conduct this salt-forming reaction utilizing an aqueous solution of the carbonate of the desired alkali metal or alkaline earth metal.

In carrying out the salt-forming reaction, it has been found advantageous to add a lower aliphatic alcohol to the aqueous alkaline mixture to facilitate solution of the acid ester of cortisone. The resulting mixture is then warmed to a temperature of about 40–50 C. thereby forming an aqueus solution of the components. The water is conveniently removed from the resulting solution by freeze-drying the solution thereby producing the desired salt of the acid ester of cortisone which is ordinarily obtained in amorphous form.

Both the acid esters of cortisone and their alkali and alkaline earth metal salts are more soluble in water than the corresponding esters of cortisone with monobasic carboxylic acids. The latter esters are ordinarily only slightly soluble in water, as illustrated by cortisone acetate which is soluble in water only to the extent of 2 mg. per 100 ml. of water. The 21-hemisuccinate (acid ester) of cortisone is four times as soluble, i. e. to the extent of 8 mg. per 100 ml. of water. The alkali metal and alkaline earth metal salts of the 21-hemisuccinate of cortisone are from 50 to over 1500 times as soluble as cortisone acetate; for example the calcium and ammonium salts are soluble to the extent of 100 mg. per 100 ml. of water, whereas the lithium, sodium and potassium salts are soluble to the extent of about 5000-6700 mg. per 100 ml. of water.

The following examples illustrate methods of carrying out the present invention, but it is to be understood that these examples are given for purposes of illustration and not of limitation.

Example 1

1 gm. of succinic anhydride (recrystallized from acetone) was dissolved in 5 cc. of freshly distilled pyridine by warming. To the cooled solution (room temperature) 0.5 g. of finely ground cortisone were added and the mixture was allowed to stand at room temperature under nitrogen with occasional swirling to help bring the reactants into solution. After 24 hours the slightly yellowish solution was added dropwise with stirring into ice water (about 50 cc.) containing 6 cc. concentrated hydrochloric acid. The fine needles that separated were chilled and filtered, then washed with water until the washings were neutral. The product was dried in vacuo at 90° C. to give 0.61 g. of nearly pure $\Delta^4$-3,11,20-triketo-17$\alpha$-hydroxy-21-($\beta$-carboxy-propionoxy)-pregnene (i. e. cortisone-21-hemisuccinate) melting at 205–207° C. After recrystallization from acetone-petroleum ether, the cortisone-21-hemisuccinate melted at 206–208° C. Anal. calc'd for $C_{25}H_{32}O_8$: C, 65.20; H, 7.01. Found: C, 65.29; H, 7.05. $[\alpha]_D^{24} = +182.00$ (C=1% in $CH_3OH$).

Example 2

To a solution of 0.5 g. of cortisone in 5 cc. of freshly distilled pyridine, 1.0 g. of finely ground maleic anhydride (recrystallized from chloroform-petroleum ether) was added and immediately the air in the flask was replaced by nitrogen. After standing at room temperature for 16 hours the brown solution was poured into a mixture of 50 cc. of ice water and 5.5 cc. concentrated hydrochloric acid with stirring. The aqueous solution was extracted with ether several times (using a small amount of methanol to help break emulsions). The combined ether extracts were washed with water until the washings were neutral, dried with anhydrous sodium sulfate, and filtered after treatment with charcoal. After concentration of the ether solution to a small volume, acetone was added and the solution was again concentrated to remove the rest of the ether. On dilution with petroleum ether (B. P. 70–115° C.) pyramidal prisms separated and these were purified by further recrystallization from acetone-petroleum ether to produce substantially pure $\Delta^4$-3,11,20-triketo-17$\alpha$,21-($\beta$-carboxy-acryloxy)-pregnene (i. e. cortisone-21-maleate) at 275.6–277° C. Anal. calc'd for $C_{25}H_{30}O_8$: C, 65.49; H, 6.59. Found: C, 65.24; H, 6.55. $[\alpha]_D^{24} = +230$ (C=1% in $CH_3OH$).

Example 3

0.5 g. of finely ground cortisone were added to a solution of 0.4 g. of phthalic anhydride in 5 cc. freshly distilled pyridine. After standing for 24 hours the nearly colorless solution was added to ice water containing hydrochloric acid and the precipitate which formed was recovered by filtration. The precipitate was washed three times with water and then twice with hot water to remove any of the phthalic acid formed during the reaction from the excess of phthalic anhydride used. After drying on the water bath there is obtained 0.66 g. of nearly pure $\Delta^4$-3,11,20-striketo-17$\alpha$-hydroxy-21-(ortho-carboxy-benzoxy)-pregnene (cortisone-21-hemisphthalate) (M. P. 212° C. After recrystallization from dilute methanol (90%) the cortisone-21-phthalate (recovered in 90% yield) melted at 212–213° C. Anal. calc'd for $C_{29}H_{32}O_8$: C, 68.49; H, 6.34. Found: C, 68.32; H, 6.37. $[\alpha]_D^{24} = +199$ (C=1% MeOH).

Modifications may be made in carrying out the present invention without departing from the spirit and scope thereof. Insofar as these changes and modifications are within the purview of the annexed claims they are to be considered as part of my invention.

I claim:

1. A compound selected from the group which consists of $\Delta^4$-3,11,20-triketo-17-hydroxy-21-($\beta$-carboxy-propionoxy)-pregnene, $\Delta^4$-3,11,20-triketo-17-hydroxy-21-(ortho-carboxy-benzoxy)-pregnene, $\Delta^4$-3,11,20-triketo-17-hydroxy-21-($\beta$-carboxy-acryloxy)-pregnene, and alkali metal and alkaline earth metal salts thereof.

2. $\Delta^4$-3,11,20-triketo-17$\alpha$-hydroxy-21-($\beta$-carboxy-propionoxy)-pregnene.

3. The sodium salt of $\Delta^4$-3,11,20-triketo-17$\alpha$-hydroxy-21-($\beta$-carboxy-propionoxy)-pregnene.

4. The potassium salt of $\Delta^4$-3,11,20-triketo-17$\alpha$-hydroxy-21-($\beta$-carboxy-propionoxy)-pregnene.

5. $\Delta^4$-3,11,20-triketo-17$\alpha$-hydroxy-21-(ortho-carboxy-benzoxy)-pregnene.

6. $\Delta^4$-3,11,20-triketo-17$\alpha$-hydroxy-21-($\beta$-carboxy-acryloxy)-pregnene.

HUANG MINLON.

References Cited in the file of this patent

UNITED STATES PATENTS

| Number | Name | Date |
|---|---|---|
| 2,462,133 | Sarett | Feb. 22, 1949 |

FOREIGN PATENTS

| Number | Country | Date |
|---|---|---|
| 210,712 | Switzerland | Nov. 1, 1940 |

OTHER REFERENCES

Fieser, Natural Products Related to Phenanthrene, 3rd Ed., pp. 410–411 (1949).